Patented Oct. 6, 1942

2,297,864

UNITED STATES PATENT OFFICE 2,297,864

DIALDEHYDE COMPOUND AND PROCESS FOR MAKING SAME

Hans Beck, Krefeld, Germany, assignor to Heberlein Patent Corporation, New York, N. Y., a corporation of New York No Drawing. Original application May 22, 1937, Serial No. 144,304. Divided and this application April 11, 1939, Serial No. 267,339. In Germany May 27, 1936

9 Claims. (Cl. 260—404)

This invention relates to dialdehyde reaction products and processes for making the same.

This application is a division of my copending application Serial No. 144,304, filed May 22, 1937, now Patent No. 2,242,051, issued May 13, 1941.

I have found in accordance with my invention a series of new and useful products, may may be designated as dialdehyde reaction products and processes for producing the same. The products may be represented by the formula Y.CHO, where Y is a member selected from the group consisting of R.CO.NH.CH2O,
    (R.CO.NH)2CH,
    R.CO.NH.CH2O aryl,
    R1.NH.CH2O, and
    (R2.O)2CH and R is selected from the group consisting of an aliphatic radical and a naphthenic radical, $R^1$ is an aliphatic radical, and $R^2$ contains an aliphatic radical. This radical may be combined with one or more cyclic groups as found, for example, in the members of the sterol or wool fat group. Each of said radicals R, $R^1$ and $R^2$ contains at least 10 carbon atoms. The said products are particularly useful, for instance, in producing water-repellence in textiles and other materials as set forth in said above-mentioned patent, but their use is not restricted thereto.

The principal objects of the present invention accordingly are to provide a series of useful compounds of the type mentioned and to produce simple efficient processes for the manufacture of such compounds. In order that the nature of these reaction products may be better understood, the following represent typical examples of reactions of dialdehydes with the substances mentioned although it will be understood that these reactions are given purely for illustrative purposes and that the invention is not to be considered as restricted thereto except as indicated in the appended claims. The reactions are:

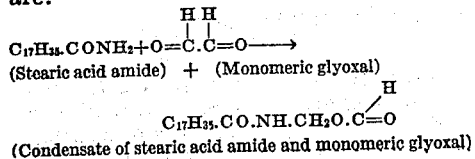
(Stearic acid amide) + (Monomeric glyoxal)

C17H35.CO.NH.CH2O.C=O (with H)
(Condensate of stearic acid amide and monomeric glyoxal)   (1)

Or reaction with two molecules of the acid amide is as follows:

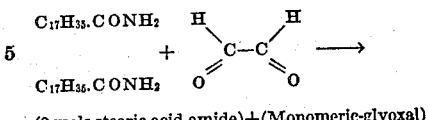
(2 mols stearic acid amide) + (Monomeric-glyoxal)

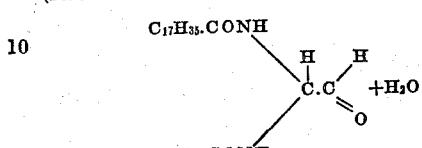
(Condensate of 2 mols stearic acid amide and monomeric glyoxal)  (2)

Reaction with an amine is as follows:

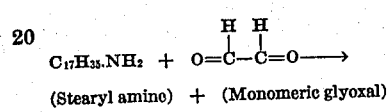
(Stearyl amine) + (Monomeric glyoxal)

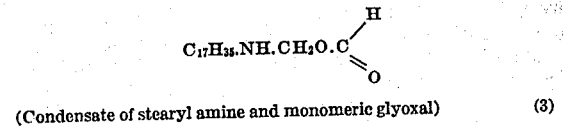
(Condensate of stearyl amine and monomeric glyoxal)   (3)

Reaction with an alcohol is as follows:

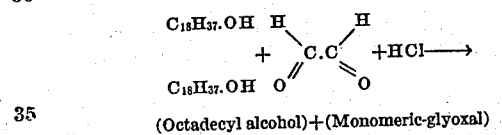
(Octadecyl alcohol) + (Monomeric-glyoxal)

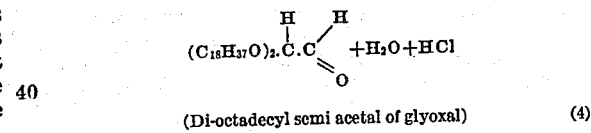
(Di-octadecyl semi acetal of glyoxal)   (4)

Substances which we have successfully made in accordance with my invention, in addition to the above, include the following:

The reaction product of stearic acid amide and polyglyoxal. The formulae for the reaction products are the same as given above for the combination of one and two mols of stearic acid amide with monomeric glyoxal.

The reaction product of palmitic acid amide and polyglyoxal, having the formulae:

(With 1 mol of palmitic acid amide)

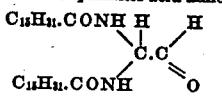

(With 2 mols of palmitic acid amide)

The reaction product of stearic acid amide and terephthalic aldehyde:

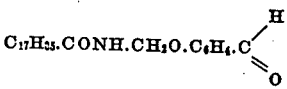

and others.

The aldehydes herein mentioned can be prepared in accordance with the following examples. The examples given are to be regarded as illustrative and the invention is not to be considered restricted thereto except as indicated in the appended claims.

*Example 1.*—284 grams of stearic acid amide

are dissolved in 1 liter of carbon tetrachloride and there are added thereto 58 grams of monomeric-glyoxal

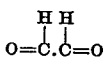

The mixture is heated for about 30 minutes to 70° C. (158° F.). With decoloration of the solution the dialdehyde reaction product having a straight chain of more than 10 carbon atoms is formed.

*Example 2.*—58 grams of polyglyoxal

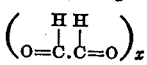

are introduced into 600 grams of acetic acid anhydride, and the mixture is heated to 120° C. (248° F.). To the solution there are then added 248 grams of stearic acid amide

whereupon the formation of the dialdehyde reaction product having a straight chain of more than 10 carbon atoms takes place with decoloration of the solution.

*Example 3.*—58 grams of polyglyoxal

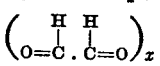

are dissolved in 120 cu. cm. of water and are stirred together with 260 grams of palmitic acid amide

to form the dialdehyde reaction product having a straight chain of more than 10 carbon atoms. The paste is then dried and subjected for 2 hours to a temperature of 110° C. (230° F.).

*Example 4.*—134 grams of terephthalic aldehyde

are dissolved in 1 liter of carbon tetrachloride and to it there are added 284 grams of stearic acid amide

The mixture is heated for a time. A dialdehyde reaction product having a straight chain of more than 10 carbon atoms of high molecular weight is formed. The product is:

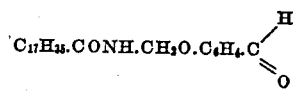

*Example 5.*—270 grams of octadecyl alcohol

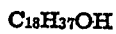

are dissolved in 2 liters of benzine, 30 grams of monomeric glyoxal

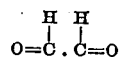

are added thereto, and dry hydrochloric acid gas is introduced into the solution. A dialdehyde reaction product having a straight chain of more than 10 carbon atoms of high molecular weight is formed. The product is: di-octadecyl semi acetal of glyoxal

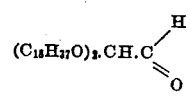

In place of stearic acid amide and palmitic acid amide other aliphatic amides may be employed, for instance lauric acid amide, montanic acid amide, naphthenic acid amide may be employed. Instead of these amides, amines may be employed such as stearyl amine or mixtures of primary saturated amines which are obtained by the hydration of train oils, for example as described in D. R. P. 611,924 or French Patent No. 761,952. In place of the amides or amines, alcohols may be employed such as octadecyl alcohol, myricyl alcohol, etc. The production of the aldehydes from amines and alcohols is effected in the same manner as from the amides and presents no peculiarity.

While the invention has been described in detail according to the preferred manner of carrying out the process, it will be obvious to those skilled in the art after understanding the invention, that changes and modifications may be made therein without departing from the spirit and scope of the invention, and it is intended to cover all such changes and modifications.

What is claimed as new and desired to be secured by Letters Patent is:

1. A new substance having the formula Y.CHO, where Y is a member selected from the group consisting of R.CO.NH.CH$_2$O,
(R.CO.NH)$_2$CH,
R.CO.NH.CH$_2$O aryl,
R$^1$.NH.CH$_2$O, and
(R$^2$.O)$_2$CH and R is selected from a group consisting of aliphatic radicals and naphthenic radicals, R$^1$ is an aliphatic radical, and R$^2$ contains an aliphatic radical, each of said radicals R, R$^1$ and R$^2$ containing at least 10 carbon atoms.

2. As a new substance, the product of reaction of terephthalic aldehyde and stearic acid amide having the formula

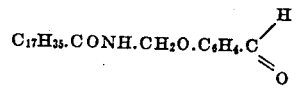

3. A process of the kind described which comprises reacting monomeric-glyoxal with stearic acid amide to produce a product of condensation of stearic acid amide with monomeric glyoxal.

4. A process of the kind described which comprises reacting polyglyoxal with stearic acid amide to produce a product of condensation of stearic acid amide with polyglyoxal.

5. A process of the kind described which comprises reacting terephthalic aldehyde with stearic acid amide to produce a product of condensation of stearic acid amide with terephthalic aldehyde.

6. As a new substance, a condensate of stearic acid amide and monomeric glyoxal having the formula

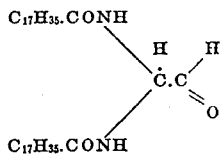

7. As a new substance, a condensate of stearic acid amide with polyglyoxal having the formula

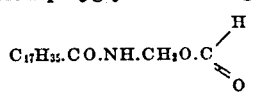

8. A process of the kind described which comprises combining a dialdehyde with a material selected from the group consisting of an aliphatic amide, a naphthenic amide, an aliphatic amine, an alcohol containing an aliphatic radical, each of which contains a radical having at least 10 carbon atoms, said aliphatic radicals having said carbon atoms in a straight chain, and producing a condensate of said dialdehyde through one aldehyde group with the said radical having at least 10 carbon atoms.

9. A process of the kind described which comprises combining monomeric glyoxal with a material selected from the group consisting of an aliphatic amide, a naphthenic amide, an aliphatic amine, and an alcohol containing an aliphatic radical, each of which contains a radical having at least 10 carbon atoms, and producing a condensate of said glyoxal through one aldehyde group with the said radical having at least 10 carbon atoms.

HANS BECK.

CERTIFICATE OF CORRECTION.

Patent No. 2,297,864. October 6, 1942.

HANS BECK.

It is hereby certified that error appears in the printed specification of the above numbered patent requiring correction as follows: Page 1, first column, line 7, for the word "may" read --which--; page 2, first column, line 46, for "248 grams" read --284 grams--; and that the said Letters Patent should be read with this correction therein that the same may conform to the record of the case in the Patent Office.

Signed and sealed this 10th day of November, A. D. 1942.

(Seal)

Henry Van Arsdale,
Acting Commissioner of Patents.